(12) United States Patent
Takamori et al.

(10) Patent No.: US 10,103,383 B2
(45) Date of Patent: Oct. 16, 2018

(54) TRANSITION METAL COMPOSITE HYDROXIDE AND LITHIUM COMPOSITE METAL OXIDE

(71) Applicant: SUMITOMO CHEMICAL COMPANY, LIMITED, Tokyo (JP)

(72) Inventors: Kenji Takamori, Tsukuba (JP); Hiroshi Inukai, Tsuchiura (JP); Taiga Obayashi, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/142,266

(22) Filed: Apr. 29, 2016

(65) Prior Publication Data

US 2016/0240850 A1    Aug. 18, 2016

Related U.S. Application Data

(62) Division of application No. 13/700,916, filed as application No. PCT/JP2011/063758 on Jun. 9, 2011, now Pat. No. 9,356,288.

(30) Foreign Application Priority Data

Jun. 17, 2010   (JP) ................. 2010-138047

(51) Int. Cl.
| | | |
|---|---|---|
| *H01M 4/505* | (2010.01) | |
| *H01M 4/525* | (2010.01) | |
| *C01G 53/00* | (2006.01) | |
| *H01M 4/485* | (2010.01) | |
| *H01M 4/52* | (2010.01) | |
| *H01M 6/18* | (2006.01) | |
| *H01M 10/052* | (2010.01) | |
| *H01M 2/02* | (2006.01) | |
| *H01M 2/08* | (2006.01) | |
| *H01M 2/16* | (2006.01) | |
| *H01M 4/04* | (2006.01) | |
| *H01M 4/131* | (2010.01) | |
| *H01M 4/1391* | (2010.01) | |
| *H01M 4/38* | (2006.01) | |
| *H01M 4/62* | (2006.01) | |
| *H01M 4/66* | (2006.01) | |
| *H01M 10/0525* | (2010.01) | |
| *H01M 10/0568* | (2010.01) | |
| *H01M 10/0569* | (2010.01) | |
| *H01M 10/0585* | (2010.01) | |
| *H01M 4/02* | (2006.01) | |

(52) U.S. Cl.
CPC .......... *H01M 4/505* (2013.01); *C01G 53/006* (2013.01); *C01G 53/50* (2013.01); *H01M 4/485* (2013.01); *H01M 4/525* (2013.01); *C01P 2002/54* (2013.01); *C01P 2004/61* (2013.01); *C01P 2004/62* (2013.01); *C01P 2006/40* (2013.01); *H01M 2/0222* (2013.01); *H01M 2/08* (2013.01); *H01M 2/1653* (2013.01); *H01M 4/0404* (2013.01); *H01M 4/131* (2013.01); *H01M 4/1391* (2013.01); *H01M 4/382* (2013.01); *H01M 4/52* (2013.01); *H01M 4/623* (2013.01); *H01M 4/625* (2013.01); *H01M 4/661* (2013.01); *H01M 6/185* (2013.01); *H01M 10/052* (2013.01); *H01M 10/0525* (2013.01); *H01M 10/0568* (2013.01); *H01M 10/0569* (2013.01); *H01M 10/0585* (2013.01); *H01M 2004/028* (2013.01); *H01M 2220/30* (2013.01); *H01M 2300/004* (2013.01); *Y02E 60/122* (2013.01); *Y02P 70/54* (2015.11); *Y02T 10/7011* (2013.01)

(58) Field of Classification Search
CPC .............................. H01M 4/502; H01M 4/523
See application file for complete search history.

(56) References Cited

U.S. PATENT DOCUMENTS

| | | | |
|---|---|---|---|
| 6,447,958 B1 | 9/2002 | Shinohara et al. | |
| 9,728,778 B2 * | 8/2017 | Harada | H01M 4/485 |
| 2003/0170540 A1 | 9/2003 | Ohzuku et al. | |
| 2009/0068563 A1 * | 3/2009 | Kanda | H01M 4/13 |
| | | | 429/306 |
| 2011/0151327 A1 | 6/2011 | Imanari | |

FOREIGN PATENT DOCUMENTS

| | | |
|---|---|---|
| CN | 101728529 A | 6/2010 |
| JP | 10-324758 A | 12/1998 |
| JP | 2000-30686 A | 1/2000 |
| JP | 2004-349109 A | 12/2004 |
| JP | 2007-123255 A | 5/2007 |
| JP | 2008-84871 A | 4/2008 |
| WO | 2010/027038 A1 | 3/2010 |

OTHER PUBLICATIONS

First Office Action dated Dec. 23, 2013 in corresponding Chinese Patent Application No. 201180028993.8 with English translation.
Office Action dated Aug. 26, 2014 in corresponding Japanese Patent Application No. 2010-138047 with English translation.
Office Action dated Oct. 21, 2014 in corresponding Japanese Patent Application No. 2010-138047 with English translation.
Second Office Action dated Jun. 25, 2014 in corresponding Chinese Patent Application No. 201180028993.8 with English translation.

* cited by examiner

*Primary Examiner* — Jeremiah R Smith
(74) *Attorney, Agent, or Firm* — Sughrue Mion, PLLC

(57) ABSTRACT

Provided are a transition metal mixed hydroxide comprising an alkali metal other than Li, $SO_4$ and a transition metal element, wherein the molar ratio of the molar content of the alkali metal to the molar content of the $SO_4$ is not less than 0.05 and less than 2, and a lithium mixed metal oxide obtained by calcining a mixture of the transition metal mixed hydroxide and a lithium compound by maintaining the mixture at a temperature of 650 to 1000° C.

12 Claims, No Drawings

TRANSITION METAL COMPOSITE HYDROXIDE AND LITHIUM COMPOSITE METAL OXIDE

CROSS-REFERENCE TO RELATED APPLICATIONS

This is a divisional application of U.S. patent application Ser. No. 13/700,916, filed Nov. 29, 2012, now U.S. Pat. No. 9,356,288, which is a 371 National Stage entry of PCT/JP2011/063758, filed Jun. 9, 2011, which claims benefit to Japanese Patent Application No. JP 2010-138047, filed Jun. 17, 2010, the entire disclosures of which are hereby incorporated by reference.

TECHNICAL FIELD

The present invention relates to a transition metal mixed hydroxide and a lithium mixed metal oxide, and particularly to a lithium mixed metal oxide to be used as a positive electrode active material in a nonaqueous electrolyte secondary battery and a transition metal mixed hydroxide to be used as a raw material for the oxide.

BACKGROUND ART

Transition metal mixed hydroxides have been used as raw materials for positive electrode active materials in nonaqueous electrolyte secondary batteries such as lithium secondary batteries. Lithium secondary batteries have already been put to practical use as small-sized power sources such as cellular phone applications, and notebook computer applications, and moreover their application has been attempted also in large-sized power sources such as automobile applications, and electric power storage applications.

Patent Document 1 has specifically disclosed, as a conventional transition metal mixed hydroxide, a transition metal mixed hydroxide made from Ni and Mn as main ingredients, wherein the content of $SO_4$ is 730 ppm by weight and the content of an alkali metal is 1700 ppm by weight.

PRIOR ART DOCUMENT

Patent Document

Patent Document 1: JP2008-84871A

SUMMARY OF THE INVENTION

However, it is difficult to say that nonaqueous electrolyte secondary batteries in which a lithium mixed metal oxide having been produced using as a raw material the abovementioned transition metal mixed hydroxide is used as a positive electrode active material are sufficient in capacity and output characteristics. An object of the present invention is to provide a lithium mixed metal oxide useful for a positive electrode active material capable of affording a nonaqueous electrolyte secondary battery superior in capacity and output characteristics.

MEANS FOR SOLVING THE PROBLEMS

The present invention provides the following.
<1> A transition metal mixed hydroxide containing an alkali metal other than Li, $SO_4$ and a transition metal element, wherein the molar ratio of the molar content of the alkali metal to the molar content of the $SO_4$ is not less than 0.05 and less than 2.
<2> The transition metal mixed hydroxide according to <1>, wherein the molar ratio is not less than 1 and less than 2.
<3> The transition metal mixed hydroxide according to <1> or <2>, wherein the transition metal element represents Ni, Mn and Fe.
<4> The transition metal mixed hydroxide according to <3>, wherein the molar ratio of Ni:Mn:Fe is (1−x−y):x:y, wherein x is not less than 0.3 and not more than 0.7 and y is more than 0 and less than 0.2.
<5> The transition metal mixed hydroxide according to any one of <1> to <4>, wherein the molar ratio of the molar content of the alkali metal to the molar content of the transition metal mixed hydroxide is 0.00001 to 0.003.
<6> The transition metal mixed hydroxide according to any one of <1> to <5>, wherein the alkali metal is K.
<7> A method for producing a lithium mixed metal oxide, the method comprising calcining a mixture of the transition metal mixed hydroxide according to any one of <1> to <6> and a lithium compound by maintaining the mixture at a temperature of 650 to 1000° C.
<8> The method according to <7>, wherein the transition metal mixed hydroxide is obtained by a method comprising the following steps (1) and (2) in the stated order:
 (1) a step of bringing an aqueous solution containing a transition metal element and $SO_4$ into contact with an alkali containing an alkali metal other than Li to obtain a coprecipitate slurry,
 (2) a step of obtaining a transition metal mixed hydroxide from the coprecipitate slurry.
<9> The method according to <8>, wherein the aqueous solution is an aqueous solution obtained by dissolving a sulfate of Ni, a sulfate of Mn and a sulfate of Fe in water.
<10> The method according to <9>, wherein the sulfate of Fe is a sulfate of divalent Fe.
<11> A lithium mixed metal oxide obtained by calcining a mixture of the transition metal mixed hydroxide according to any one of <1> to <6> and a lithium compound by maintaining the mixture at a temperature of 650 to 1000° C.
<12> A positive electrode active material comprising the lithium mixed metal oxide according to <11>.
<13> A positive electrode comprising the positive electrode active material according to <12>.
<14> A nonaqueous electrolyte secondary battery comprising the positive electrode according to <13>.
<15> The nonaqueous electrolyte secondary battery according to <14> further comprising a separator.
<16> The nonaqueous electrolyte secondary battery according to <15>, wherein the separator is a laminated film which has a heat resistant porous layer and a porous film laminated to each other.

MODE FOR CARRYING OUT THE INVENTION

<Transition Metal Mixed Hydroxide>
The transition metal mixed hydroxide of the present invention can be a raw material for a lithium mixed metal oxide. The lithium mixed metal oxide can be a positive electrode active material of a nonaqueous electrolyte secondary battery. The transition metal mixed hydroxide contains an alkali metal other than Li, $SO_4$ and a transition metal element, wherein the molar ratio of the molar content of the alkali metal to the molar content of the $SO_4$ is not less than 0.05 and less than 2.

When the molar ratio is less than 0.05 or not less than 2, the capacity and output characteristics of a resulting nonaqueous electrolyte secondary battery become lower. In order to increase the capacity of a secondary battery, the molar ratio is preferably not less than 0.5 and less than 2, and more preferably not less than 1 and less than 2.

In order to improve the output characteristics of a resulting nonaqueous electrolyte secondary battery, the molar ratio of the molar content of $SO_4$ to the molar content of the transition metal mixed hydroxide is preferably 0.0011 to 0.05, more preferably 0.0013 to 0.04, and even more preferably 0.0015 to 0.03.

In order to improve the capacity of a resulting nonaqueous electrolyte secondary battery, the molar ratio of the molar content of the alkali metal to the molar content of the transition metal mixed hydroxide is preferably 0.00001 to 0.003, more preferably 0.00005 to 0.002, and even more preferably 0.0001 to 0.001.

In order to improve the output characteristics of a resulting nonaqueous electrolyte secondary battery, the alkali metal is preferably K.

In order to improve the capacity and output characteristics of a resulting nonaqueous electrolyte secondary battery, the transition metal elements constituting the transition metal mixed hydroxide are preferably Ni, Mn and Fe. When the molar ratio of Ni:Mn:Fe in the transition metal mixed hydroxide is expressed by $(1-x-y):x:y$, it is preferable that x be not less than 0.3 and not more than 0.7 and y be more than 0 and less than 0.2, and it is more preferable that x be not less than 0.4 and not more than 0.5 and y be more than 0 and less than 0.1.

Unless the effect of the present invention is impaired, some of the transition metal elements constituting the transition metal mixed hydroxide may be substituted with other elements. Examples of such other elements include elements such as B, Al, Ga, In, Si, Ge, Sn, P, Mg, Ca, Sr, Ba and Zn.

<Method for Producing a Lithium Mixed Metal Oxide>

A lithium mixed metal oxide can be produced by calcining a mixture of a transition metal mixed hydroxide and a lithium compound by maintaining the mixture at a temperature of 650 to 1000° C. The lithium mixed metal oxide is suitable as a positive electrode active material for nonaqueous electrolyte secondary batteries.

A specific example of the method of producing the transition metal mixed hydroxide and the lithium mixed metal oxide of the present invention is a method comprising the following steps (1), (2) and (3) in the stated order:

(1) a step of bringing an aqueous solution containing a transition metal element and $SO_4$ into contact with an alkali containing an alkali metal other than Li to obtain a coprecipitate slurry, (2) a step of obtaining a transition metal mixed hydroxide from the coprecipitate slurry, (3) a step of obtaining a lithium mixed metal oxide by calcining a mixture by maintaining the mixture at a temperature of 650 to 1000° C., which mixture has been obtained by mixing the transition metal mixed hydroxide and a lithium compound.

The transition metal mixed hydroxide can be obtained particularly by a method comprising the steps (1) and (2) described above.

In step (1), for the aqueous solution containing a transition metal element and $SO_4$, a sulfate of one or more transition metal elements may be used as a raw material containing a transition metal element, or alternatively a sulfate of one or more transition metal elements and a water-soluble salt of one or more transition metal elements other than sulfates may be used as a raw material containing a transition metal element. Using a water-soluble salt of one or more kinds of transition metal elements other than sulfates as a raw material containing a transition metal element, there may be used an aqueous solution prepared by adding a solution containing $SO_4$, for example, sulfuric acid, to an aqueous solution having been prepared by dissolving the water-soluble salt in water. There may also be used an aqueous solution prepared by dissolving a metal raw material containing a transition metal element in sulfuric acid.

When the aqueous solution containing a transition metal element and $SO_4$ is an aqueous solution containing Ni, Mn, Fe and $SO_4$, there can be used an aqueous solution having been prepared by weighing a sulfate of Ni, a sulfate of Mn and a sulfate of Fe so that the molar ratio of Ni:Mn:Fe may become, for example, the above-mentioned $(1-x-y):x:y$, and then dissolving them in water. The sulfate of Fe is preferably a sulfate of divalent Fe.

In step (1), the alkali containing an alkali metal other than Li may be one or more compounds selected from the group consisting of NaOH (sodium hydroxide), KOH (potassium hydroxide), $Na_2CO_3$ (sodium carbonate) and $K_2CO_3$ (potassium carbonate), and the compounds may be either anhydrous or hydrated. One or more compounds selected from the group consisting of LiOH (lithium hydroxide), $Li_2CO_3$ (lithium carbonate) and $(NH_4)_2CO_3$ (ammonium carbonate) may be added to the alkali. In step (1), it is preferred to use an aqueous solution of the above-mentioned alkali. There can be added ammonia water to the aqueous solution of an alkali. The concentration of the alkali in the aqueous solution of the alkali is usually about 0.5 to about 10 M (mol/L), preferably about 1 to about 8 M. The alkali is preferably KOH from a manufacturing cost aspect, and the KOH may be either anhydrous or hydrated. Two or more of the above-mentioned alkalis may be used.

Examples of the method for the contact in step (1) include a method comprising adding an aqueous solution of an alkali to an aqueous solution containing a transition metal element and $SO_4$ and mixing them, a method comprising adding an aqueous solution containing a transition metal element and $SO_4$ to an aqueous solution of an alkali and mixing them, and a method comprising adding an aqueous solution containing a transition metal element and $SO_4$ and an aqueous solution of an alkali to water and mixing them. Such mixing is preferably accompanied by stirring. Of the above-mentioned methods of contact, the method comprising adding an aqueous solution containing a transition metal element and $SO_4$ to an aqueous solution of an alkali and mixing them is preferred, as it is easier to maintain a pH change. In this case, while a pH of the mixed liquid tends to lower as the aqueous solution containing a transition metal element and $SO_4$ is added to and mixed with the aqueous solution of an alkali, it is preferred to add the aqueous solution containing a transition metal element and $SO_4$ while controlling the pH to be 9 or more, preferably 10 or more. If the contact is carried out while holding one or both of the aqueous solution containing a transition metal element and $SO_4$ and the aqueous solution of an alkali at a temperature of 40 to 80° C., a coprecipitate having a more uniform composition can be obtained.

In step (1), a coprecipitate is generated and a coprecipitate slurry can be obtained in a manner as described above.

In step (2), a transition metal mixed hydroxide is obtained from the coprecipitate slurry. Step (2) may be carried out by any method as long as a transition metal mixed hydroxide can be obtained, but a method by solid-liquid separation such as filtration is preferred from the viewpoint of ease of handle. A transition metal mixed hydroxide can also be obtained by a method in which a coprecipitate slurry is used and a liquid is volatilized by heating such as spray drying.

In the case of obtaining a transition metal mixed hydroxide by solid-liquid separation in step (2), step (2) is preferably the following step (2'):

(2') a step of subjecting the coprecipitate slurry to solid-liquid separation, followed by washing and drying, thereby obtaining a transition metal mixed hydroxide.

In step (2'), in the event that an alkali and $SO_4$ exist in excess in the solid obtained after the solid-liquid separation, the excess can be removed by washing.

In order to wash the solid efficiently, it is preferred to use water as a washing liquid. According to need, a water-soluble organic solvent such as alcohol and acetone may be added to the washing liquid. The washing may be performed twice or more; for example, after washing with water, washing may be performed again using a water-soluble organic solvent.

In step (2'), the amounts of an alkali and $SO_4$ contained in the solid obtained after the solid-liquid separation can be controllable by a washing method. As a specific method, the amounts of an alkali and $SO_4$ contained in the solid may be controlled by the amount of a washing liquid, and a solution containing an alkali and $SO_4$ in certain amounts may be used as a washing liquid. When an alkali containing an alkali metal other than Li is not used as the alkali in step (1), for example, when only one or more compounds selected from the group consisting of LiOH (Lithium hydroxide), $Li_2CO_3$ (lithium carbonate) and $(NH_4)_2CO_3$ (ammonium carbonate), which may be either anhydrous or hydrated, are used, or when only ammonia water is used, the amounts of the alkali and the $SO_4$ contained in a solid can be controlled by carrying out washing using a washing liquid containing an alkali metal other than Li in step (2) or (2').

In step (2'), a transition metal mixed hydroxide can be obtained by washing the solid and then drying it. While the drying is usually performed by heating, it may be performed by blow drying, vacuum drying, etc. In the event that the drying is performed by heating, the drying temperature is usually 50 to 300° C., and preferably about 100 to about 200° C.

In step (3), a lithium mixed metal compound is obtained by calcining a mixture prepared by mixing the transition metal mixed hydroxide obtained above and a lithium compound. The lithium compound may be one or more compounds selected from the group consisting of lithium hydroxide, lithium chloride, lithium nitrate and lithium carbonate, and the compounds may be either anhydrous or hydrated.

While the mixing may be performed by either method of dry mixing and wet mixing, dry mixing is preferred from the viewpoint of convenience. Examples of a mixing device include a stirring mixer, a V type mixer, a W type mixer, a ribbon mixer, a drum mixer and a ball mill.

The maintaining temperature in the above-mentioned calcination is an important factor for adjusting the particle diameter of a primary particle, the particle diameter of a secondary particle and the BET specific surface area of the lithium mixed metal oxide. Usually, there is a tendency that as the maintaining temperature increases, the particle diameter of a primary particle and the particle diameter of a secondary particle become larger and the BET specific surface area becomes smaller. The maintaining temperature is preferably 650 to 1000° C. The case where the maintaining temperature is lower than 650° C. is undesirable because the life characteristic of a resulting battery deteriorates, and the case where the maintaining temperature is higher than 1000° C. is undesirable because the output characteristic of a resulting battery at a high discharging rate deteriorates. The time for being maintained at the maintaining temperature is usually 0.1 to 20 hours, and preferably 0.5 to 8 hours. The temperature rise rate to the maintaining temperature is usually 50 to 400° C./hour and the temperature decrease rate from the maintaining temperature to room temperature is usually 10 to 400° C./hour. While there can be used air, oxygen, nitrogen, argon or a mixed gas thereof as an atmosphere for the calcination, the air is preferred.

After the calcination, the resulting lithium mixed metal oxide may be pulverized with a ball mill, a jet mill, or the like. In some cases, the BET specific surface area of a lithium mixed metal oxide can be adjusted by pulverization. Pulverization and calcination may be repeatedly carried out twice or more. The lithium mixed metal oxide may also be washed or classified according to need.

<Lithium Mixed Metal Oxide>

The lithium mixed metal oxide obtained by the procedures described above is useful for a nonaqueous electrolyte secondary battery superior in capacity and high output characteristics at a high discharging rate.

As long as the effect of the present invention is not impaired, to the surface of particles of the lithium mixed metal oxide may be caused to adhere a compound different from the lithium mixed metal oxide. Examples of the compound include a compound containing one or more elements selected from the group consisting of B, C, Al, Ga, In, Si, Ge, Sn, Mg and transition metal elements, preferably a compound containing one or more elements selected from the group consisting of B, C, Al, Mg, Ga, In and Sn, and more preferably a compound containing Al. Furthermore, specific examples of the compound include oxides, hydroxides, oxyhydroxides, carbonates, nitrates and organic acid salts of the above-mentioned elements, and preferred are oxides, hydroxides and oxyhydroxides. These compounds may be used in admixture. Of these compounds, a particularly preferable compound is alumina. The adhesion may be followed by heating.

In order to obtain a nonaqueous electrolyte secondary battery that is high in capacity and has high output characteristics, the average of the particle diameter of the primary particles constituting the lithium mixed metal oxide is preferably 0.01 to 0.5 µm. Lithium mixed metal oxides are usually composed of primary particles and secondary particles formed by aggregation of such primary particles. The particle diameter of the secondary particles is preferably 0.1 to 3 µm. The particle diameters of the primary particles and the secondary particles can be measured by observing the particles using a scanning electron microscope (hereinafter sometimes described as a SEM). The average of the particle diameters of the primary particles is more preferably 0.05 to 0.3 µm, and the average of the particle diameters of the secondary particles is more preferably 0.15 to 2 µm. The BET specific surface area of the lithium mixed metal oxide is preferably 3 to 20 $m^2/g$.

In order to enhance the effect of the present invention, the lithium mixed metal oxide preferably has an α-$NaFeO_2$ type crystal structure, that is, a crystal structure that belongs to an R-3m space group. The crystal structure can be identified from a powder X-ray diffraction pattern obtained by performing powder X-ray diffraction analysis using CuKα as a radiation source to a lithium mixed metal oxide.

<Positive Electrode>

The above-mentioned lithium mixed metal oxide can be used as a positive electrode active material. The positive electrode active material comprising the lithium mixed metal oxide is used for a positive electrode. The positive electrode is suitable for a nonaqueous electrolyte secondary battery.

A method of producing the positive electrode using the lithium mixed metal oxide (positive electrode active material) is described below by taking the case of producing a positive electrode for a nonaqueous electrolyte secondary battery as an example.

The positive electrode is produced by supporting a positive electrode mixture containing a positive electrode active material, a conductive material and a binder on a positive electrode current collector. Carbonaceous materials can be used as the conductive material. Examples of such carbonaceous materials include graphite powder, carbon black (e.g. acetylene black) and fibrous carbonaceous materials. Since carbon black is in the form of fine particles and is large in surface area, the conductivity of the inside of the positive electrode can be enhanced by the addition of a small amount of carbon black into the positive electrode mixture, and the charge-discharge efficiency and the output characteristic of a nonaqueous electrolyte secondary battery can thereby be improved. However, when carbon black is added to the positive electrode mixture too much, an adhesion property by the binder between the positive electrode mixture and the positive electrode current collector is lowered, causing internal resistance to increase. In general, the proportion of the conductive material in the positive electrode mixture is 5 to 20 parts by weight per 100 parts by weight of the positive electrode active material. In the case of using a fibrous carbonaceous material, such as graphitized carbon fiber or carbon nanotube, as the conductive material, it is possible to decrease the proportion.

The binder may be a thermoplastic resin, specific examples of which include fluororesins such as polyvinylidene fluoride (hereinafter sometimes described as PVdF), polytetrafluoroethylene (hereinafter sometimes described as PTFE), tetrafluoroethylene-hexafluoropropylene-vinylidene fluoride copolymers, hexafluoropropylene-vinylidene fluoride copolymers and tetrafluoroethylene-perfluorovinyl ether copolymers; and polyolefin resins such as polyethylene and polypropylene. Two or more of such thermoplastic resins may be used in admixture. By the use of a fluororesin and a polyolefin resin as binders and the positive electrode mixture's inclusion of the fluororesin and the polyolefin resin so that the proportion of the fluororesin may become 1 to 10% by weight and the proportion of the polyolefin resin may become 0.1 to 2% by weight respectively to the positive electrode mixture, a positive electrode mixture superior in bonding property to a positive electrode current collector can be obtained. While conductive materials such as Al, Ni and stainless steel can be used as the positive electrode current collector, Al is preferred in that it can be easily processed into a thin film and it is inexpensive. Examples of the method for supporting the positive electrode mixture onto the positive electrode current collector include a method involving compression molding; and a method including preparing a positive electrode mixture paste by further use of an organic solvent, applying the paste to the positive electrode current collector, drying it, and then pressing the resulting sheet, thereby fixing the positive electrode mixture to the positive electrode current collector. The positive electrode mixture paste contains a positive electrode active material, a conductive material, a binder and an organic solvent. Examples of the organic solvent include amine solvents, such as N,N-dimethylaminopropylamine and diethylenetriamine; ether solvents, such as tetrahydrofuran; ketone solvents, such as methyl ethyl ketone; ester solvents, such as methyl acetate; and amide solvents, such as dimethylacetamide and N-methyl-2-pyrrolidone (hereinafter sometimes described as NMP).

Examples of the method of applying the positive electrode mixture paste to the positive electrode current collector include a slit-die coating method, a screen coating method, a curtain coating method, a knife coating method, a gravure coating method and an electrostatic spray method. As described above, a positive electrode can be produced.

<Nonaqueous Electrolyte Secondary Battery>

A method of producing a nonaqueous electrolyte secondary battery using the above-mentioned positive electrode will be described. A lithium secondary battery can be produced by a method that comprises obtaining an electrode group by laminating or laminating and winding a separator, a negative electrode and the above-mentioned positive electrode, putting the electrode group in a battery can, and then pouring an electrolytic solution into the battery can.

Examples of the shape of the electrode group include shapes having a cross section such as a circular shape, an elliptical shape, a rectangular shape or a rectangular shape with round corners, when the electrode group is cut in the direction perpendicular to the axis of winding of the electrode group. Examples of the shape of the battery include a paper shape, a coin shape, a cylinder shape and a rectangular shape.

<Negative Electrode>

A negative electrode can be doped and dedoped with lithium ions at a lower electric potential than that of a positive electrode. Examples of the negative electrode include an electrode in which a negative electrode mixture containing a negative electrode material is supported on a negative electrode current collector; and an electrode made of a negative electrode material alone. Examples of such a negative electrode material include carbonaceous materials, chalcogen compounds (e.g., oxides and sulfides), nitrides, metals or alloys which are materials capable of being doped and dedoped with lithium ions at a lower electric potential than that of the positive electrode. Such negative electrode materials may be used in admixture.

Examples of the negative electrode material are described below. Specific examples of the above-mentioned carbonaceous materials include graphites such as natural graphites and artificial graphites, cokes, carbon black, pyrolytic carbons, carbon fibers and calcined organic polymer compounds. Specific examples of the oxide include oxides of silicon represented by the formula $SiO_x$ (x is a positive real number), such as $SiO_2$ and SiO; oxides of titanium represented by the formula $TiO_x$ (x is a positive real number), such as $TiO_2$ and TiO; oxides of vanadium represented by the formula $VO_x$ (x is a positive real number), such as $V_2O_5$ and $VO_2$; oxides of iron represented by the formula $FeO_x$ (x is a positive real number), such as $Fe_3O_4$, $Fe_2O_3$ and FeO; oxides of tin represented by the formula $SnO_x$ (x is a positive real number), such as $SnO_2$ and SnO; oxides of tungsten represented by the formula $WO_x$ (x is a positive real number), such as $WO_3$ and $WO_2$; and mixed metal oxides containing lithium and titanium and/or vanadium, such as $Li_4Ti_5O_{12}$ and $LiVO_2$. Specific examples of the sulfide include sulfides of titanium represented by the formula $TiS_x$ (x is a positive real number), such as $Ti_2S_3$, $TiS_2$ and TiS; sulfides of vanadium represented by the formula $VS_x$ (x is a positive real number), such as $V_3S_4$, $VS_2$ and VS; sulfides of iron represented by the formula $FeS_x$ (x is a positive real number), such as $Fe_3S_4$, $FeS_2$ and FeS; sulfides of molybdenum represented by the formula $MoS_x$ (x is a positive real number), such as $Mo_2S_3$ and $MoS_2$; sulfides of tin represented by the formula SnS (x is a positive real number), such as $SnS_2$ and SnS; sulfides of tungsten represented by the formula $WS_x$ (x is a positive real number), such as $WS_2$; sulfides of antimony represented by the formula $SbS_x$ (x is a positive real number), such as $Sb_2S_3$; and sulfides of selenium represented by the formula SeS (x is a positive real number), such as $Se_5S_3$, $SeS_2$ and SeS. Specific examples of the nitride include lithium-containing nitrides such as $Li_3N$ and $Li_{3-x}A_xN$ wherein A is Ni and/or Co; and $0<x<3$. The carbonaceous materials, the oxides, the sulfides and the nitrides may be used in combination of two or more species. They may be either crystalline or amorphous. The carbonaceous materials, the oxides, the sulfides and the nitrides are generally supported on a negative electrode current collector and then used as an electrode. Specific examples of such metals include lithium metal, silicon metal, and tin metal. Examples of the alloys include lithium alloys such as Li—Al, Li—Ni and Li—Si; silicon alloys such as Si—Zn; tin alloys such as Sn—Mn, Sn—Co, Sn—Ni, Sn—Cu and Sn—La; and alloys such as $Cu_2Sb$ and $La_3Ni_2Sn_7$. These metals and alloys are generally used alone as an electrode (for example, used in a foil form).

Of the above-mentioned negative electrode materials, a carbonaceous material containing graphite such as natural graphite or artificial graphite as a main component is preferably used from the viewpoint of high potential flatness, low average discharge potential, and good cyclability. Examples of the shape of the carbonaceous material include a flaky shape such as that of naturally occurring graphite, a spherical shape such as that of mesocarbon microbeads, and a fibrous shape such as that of graphitized carbon fibers. The carbonaceous material may be an aggregate of a fine powder.

The negative electrode mixture may contain a binder as needed. Such a binder may be a thermoplastic resin and specific examples thereof include PVdF, thermoplastic polyimide, carboxymetylcellulose, polyethylene and polypropylene.

Examples of the negative electrode current collector include conductive materials such as Cu, Ni and stainless steel, and Cu is preferred in that it is difficult to form an alloy with lithium and it is easy to be processed into a thin film. Examples of the method for supporting the negative electrode mixture onto the negative electrode current collector, which are similar to those in the case of the above-mentioned positive electrode, include a method by compression molding; and a method including preparing a negative electrode mixture paste by further use of a solvent and the like, applying the paste to the negative electrode current collector, drying it, and then pressing the resulting sheet, thereby fixing the negative electrode mixture to the negative electrode current collector.

<Separator>

As the separator, for example, there may be used a member being made of a material such as a polyolefin resin, such as polyethylene or polypropylene, a fluororesin, or a nitrogen-containing aromatic polymer and having a form of a porous film, a non-woven fabric, a woven fabric, or the like. The separator may be made of two or more of the above-mentioned materials and the member may be a laminated separator in which the above-mentioned members are laminated. Examples of such separators include the separators described in JP2000-30686A, JP10-324758A, and so on. The thickness of the separator is usually about 5 to about 200 μm, preferably about 5 to about 40 μm from the viewpoint of increase in the volume energy density of a battery and decrease in the internal resistance thereof. Preferably, the separator is as thin as possible, as long as mechanical strength is secured.

The separator preferably has a porous film containing a thermoplastic resin. In a nonaqueous electrolyte secondary battery, the separator is placed between the positive electrode and the negative electrode. The separator preferably has a function (shutdown function) by which, when an abnormal current flows in the battery because of, for example, short circuit between a positive electrode and a negative electrode, the current is interrupted to block the flow of excessive current. Herein, the shutdown is achieved by closing micropores of the porous film in the separator in the case of exceeding usual working temperature. It is preferable that, after the shutdown, even if the temperature in the battery increases to a certain high temperature, film breakage should not occur at the temperature and a shutdown state be maintained. Examples of such a separator include a laminated film having a heat resistant porous layer and a porous film laminated to each other. The heat resistance of a secondary battery can be further enhanced by using such a film as a separator. Herein, the heat resistant porous layer may be laminated on both surfaces of the porous film.

<Laminated Film>

A laminated film which has the heat resistant porous layer and the porous film laminated to each other is described below.

In the laminated film, the heat resistant porous layer is a layer higher in heat resistance than the porous film, and the heat resistant porous layer may be formed from an inorganic powder and may contain a heat resistant resin. When the heat resistant porous layer contains a heat resistant resin, the heat resistant porous layer can be formed by an easy method such as coating. Examples of the heat resistant resin include polyamide, polyimide, polyamideimide, polycarbonate, polyacetal, polysulfone, polyphenylene sulfide, polyetherketone, aromatic polyester, polyethersulfone and polyetherimide, and in order to further enhance heat resistance, polyamide, polyimide, polyamideimide, polyethersulfone and polyetherimide are preferred, and polyamide, polyimide and polyamideimide are more preferred. Still more preferred are nitrogen-containing aromatic polymers such as aromatic polyamides (para-oriented aromatic polyamide, meta-oriented aromatic polyamide), aromatic polyimides, and aromatic polyamideimides, especially preferred are aromatic polyamides, and, in terms of production, particularly preferred is para-oriented aromatic polyamide (hereinafter sometimes described as para-aramid). Additional examples of the heat resistant resins include poly-4-methylpentene-1 and cyclic olefin polymers. By using such heat resistant resins, the heat resistance of a laminated film, namely, the thermal film breaking temperature of the laminated film can be further increased. When a nitrogen-containing aromatic polymer selected from among these heat resistant resins is used, compatibility with an electrolytic solution may be good due to its intramolecular polarity, and, in this case, the liquid retaining property of an electrolytic solution in the heat resistant porous layer is improved. Thereby, the rate of injection of an electrolytic solution is increased in the production of a nonaqueous electrolyte secondary battery, and the charge and discharge capacity of the nonaqueous electrolyte secondary battery is further increased.

The thermal film breaking temperature of the laminated film depends on the types of a heat resistant resin and is selected and used according to a use situation and a use purpose. More specifically, the thermal film breaking temperature may be controlled to about 400° C. in the case of using the above-mentioned nitrogen-containing aromatic polymer as a heat resistant resin, to about 250° C. in the case of using poly-4-methylpentene-1, and to about 300° C. in the case of using a cyclic olefin polymer. When the heat resistant porous layer is formed from an inorganic powder, the thermal film breaking temperature may be controlled to, for example, 500° C. or more.

The above-mentioned para-aramid is obtained by condensation polymerization of a para-oriented aromatic diamine and a para-oriented aromatic dicarboxylic halide and consists substantially of repeating units in which an amide bond is bound at a para-position or according orientation position of an aromatic ring (for example, 4,4' position in biphenylene, 1,5 position in naphthalene, or 2,6 position in naphthalene). Specific examples of the para-aramids include para-aramids having a structure of para-orientation or orientation corresponding to para-orientation, such as poly(paraphenyleneterephthalamide), poly(parabenzamide), poly(4,4'-benzanilideterephthalamide), poly(paraphenylene-4,4'-biphenylenedicarboxylic amide), poly(paraphenylene-2,6-naphthalenedicarboxylic amide), poly(2-chloro-paraphenyleneterephthalamide) and paraphenyleneterephthalamide/2,6-dichloroparaphenyleneterephthalamide copolymer.

The above-mentioned aromatic polyimide is preferably a wholly aromatic polyimide produced by polycondensation of an aromatic dianhydride with a diamine. Specific examples of the dianhydride include pyromellitic dianhydride, 3,3',4,4'-diphenylsulfonetetracarboxylic dianhydride, 3,3',4,4'-benzophenonetetracarboxylic dianhydride, 2,2'-bis(3,4-dicarboxyphenyl)hexafluoropropane and 3,3',4,4'-biphenyltetracarboxylic dianhydride. Specific examples of the diamine include oxydianiline, paraphenylenediamine, benzophenonediamine, 3,3'-methylenedianiline, 3,3'-diaminobenzophenone, 3,3'-diaminodiphenylsulfone and 1,5'-naphthalenediamine. A polyimide soluble in a solvent can preferably be used. One example of such polyimides is a polyimide which is a polycondensate of 3,3',4,4'-diphenylsulfonetetracarboxylic dianhydride with an aromatic diamine.

Examples of the aromatic polyamideimide include a condensation polymerization product between an aromatic dicarboxylic acid and an aromatic diisocyanate, and a condensation polymerization product between an aromatic dianhydride and an aromatic diisocyanate. Specific examples of the aromatic dicarboxylic acid include isophthalic acid and terephthalic acid. Specific examples of the aromatic dianhydride include trimellitic anhydride. Specific examples of the aromatic diisocyanate include 4,4'-diphenylmethane diisocyanate, 2,4-tolylene diisocyanate, 2,6-tolylene diisocyanate, orthotolylane diisocyanate and m-xylene diisocyanate.

In order to improve ion permeability, the heat resistant porous layer is preferred to be thin and specifically, it is preferably 1 to 10 μm, more preferably 1 to 5 μm, and particularly preferably 1 to 4 μm. The heat resistant porous layer has micropores, the size (diameter) of which is usually not more than 3 μm, preferably not more than 1 μm. When the heat resistant porous layer contains a heat resistant resin, the heat resistant porous layer may further contain a filler as described below.

In the laminated film, the porous film preferably has micropores. The porous film preferably has a shutdown function. In this case, the porous film contains a thermoplastic resin.

The porous film has a micropore size (diameter) of usually not more than 3 μm, preferably not more than 1 μm. The porous film usually has a porosity of 30 to 80% by volume, preferably 40 to 70% by volume. When the nonaqueous electrolyte secondary battery exceeds a usual working temperature, the porous film containing a thermoplastic resin is capable of closing micropores by softening of the thermoplastic resin forming the film.

As the thermoplastic resin, one that is insoluble to the electrolytic solution in the nonaqueous electrolyte secondary battery may be selected. Specific examples of such a thermoplastic resin include polyolefin resins, such as polyethylene and polypropylene, and thermoplastic polyurethane resins, and a mixture of two or more thermoplastic resins may also be used. In order to soften at lower temperature to attain shutdown, the porous film preferably contains polyethylene. Specific examples of the polyethylene include polyethylenes such as low density polyethylenes, high density polyethylenes, and linear polyethylenes, and ultrahigh-molecular weight polyethylenes having a molecular weight of not less than 1,000,000 can also be mentioned as an example. In order to further increase the puncture strength of a porous film, the porous film preferably contains an ultra-high-molecular weight polyethylene. In order to produce a porous film easily, the thermoplastic resin preferably contains a wax made from a polyolefin having a low molecular weight (weight average molecular weight of not more than 10,000) in some cases.

The thickness of a porous film in a laminated film is usually 3 to 30 preferably 3 to 25 μm, and more preferably 3 to 19 μm. The thickness of the laminated film is usually not more than 40 μm, preferably not more than 30 μm, and more preferably not more than 20 mm. When the thickness of the heat resistant porous layer is expressed by A (μm) and the thickness of the porous film is expressed by B (μm), the value of A/B is preferably not less than 0.1 and not more than 1.

When a heat resistant porous layer contains a heat resistant resin, the heat resistant porous layer may contain one or more fillers. The material of such filler may be selected from any of organic powders, inorganic powders, and mixtures thereof. Particles constituting the filler preferably have an average particle diameter of not more than 0.01 to 1 μm.

Examples of the organic powders include powders made of organic substances, such as homopolymers or copolymers of two or more types selected from among styrene, vinyl ketone, acrylonitrile, methyl methacrylate, ethyl methacrylate, glycidyl methacrylate, glycidyl acrylate, methyl acrylate, and so on; fluorinated resins such as polytetrafluoroethylene, tetrafluoroethylene-hexafluoropropylene copolymers, tetrafluoroethylene-ethylene copolymers and PVdF; melamine resins; urea resins; polyolefin resins; and polymethacrylates. These organic powders may be used singly or two or more of them may be used in admixture. Of these organic powders, a polytetrafluoroethylene powder is preferable in terms of chemical stability.

Examples of the inorganic powder include powders made of inorganic substances, such as metal oxides, metal nitrides, metal carbides, metal hydroxides, carbonates and sulfates. Of these, preferred are powders made of inorganic substances low in electrical conductivity. Specific examples of preferable inorganic powders include a powder of alumina, silica, titanium dioxide, or calcium carbonate. These inorganic powders may be used singly or two or more of them may be used in admixture. Of these inorganic powders, an alumina powder is preferable in terms of chemical stability. It is more preferable that all particles composing the filler be alumina particles, and it is further preferable that all particles composing the filler be alumina particles and some or all of them be approximately spherical alumina particles. When the heat resistant porous layer is formed from an inorganic powder, any of the inorganic powders provided above as examples may be used and, as needed, may be used in admixture with a binder.

When the heat resistant porous layer contains a heat resistant resin, the content of a filler depends on the specific gravity of the material of the filler. For example, when all particles composing the filler are alumina particles, the weight of the filler is usually 5 to 95 parts by weight, preferably 20 to 95 parts by weight, and more preferably 30 to 90 parts by weight per 100 parts by weight of the heat resistant porous layer. These ranges may appropriately be set depending on the specific gravity of the material of the filler.

While examples of the shape of the filler include an approximately spherical shape, a plate-like shape, a pillar-like shape, a needle-like shape, a whisker-like shape, and a fibrous shape, the filler is preferably in an approximately spherical shape because uniform pores are easily formed. Examples of approximately spherical particles include particles having an aspect ratio (longer diameter of particle/shorter diameter of particle) of not less than 1 and not more than 1.5. The aspect ratio of a particle can be measured from an electron micrograph.

From the viewpoint of ion permeability in a secondary battery, a separator preferably has an air permeability, which is determined by the Gurley method, of 50 to 300 sec/100 cc, more preferably 50 to 200 sec/100 cc. The porosity of the separator is usually 30 to 80% by volume, and preferably 40 to 70% by volume. The separator may be one in which separators differing in porosity are laminated to each other.

<Electrolytic Solution or Solid Electrolyte>

In a secondary battery, an electrolytic solution usually contains an electrolyte and an organic solvent. Examples of the electrolyte include lithium salts such as $LiClO_4$, $LiPF_6$, $LiAsF_6$, $LiSbF_6$, $LiBF_4$, $LiCF_3SO_3$ $LiN(SO_2CF_3)_2$, LiN $(SO_2C_2F_5)_2$, $LiN(SO_2CF_3)$ $(COCF_3)$, $Li(C_4F_9SO_3)$ LiC $(SO_2CF_3)_3$, $Li_2B_{10}Cl_{10}$, LiBOB wherein BOB represents bis(oxalato)borate, lithium salts of lower aliphatic carboxylic acids, and $LiAlCl_4$, and two or more electrolytes may be used in admixture. Of these, one or more fluorine-containing lithium salts selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$ are usually used.

In the electrolytic solution, there can be used as the organic solvent, for example, carbonates such as propylene carbonate, ethylene carbonate (hereinafter sometimes described as EC), dimethyl carbonate (hereinafter sometimes described as DMC), diethyl carbonate, ethylmethyl carbonate (hereinafter sometimes described as EMC), 4-trifluoromethyl-1,3-dioxolane-2-one and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide and 1,3-propanesultone, or ones resulting from the introduction of fluorine substituents to the above-mentioned organic solvents. Usually, a mixed solvent in which two or more organic solvents selected from among those listed above have been mixed is used. Particularly, mixed solvents containing carbonates are preferred, and mixed solvents of cyclic carbonates with acyclic carbonates and mixed solvents of cyclic carbonates and ethers are more preferred. A mixed solvent containing EC, DMC and EMC is preferred as a mixed solvent of a cyclic carbonate and an acyclic carbonate in that this works in a wide range of temperature and is superior in load characteristics and is persistent even if a graphite material such as natural graphite or artificial graphite is used as an active material of a negative electrode. It is preferred to use an electrolytic solution containing a fluorine-containing lithium salt such as $LiPF_6$ and an organic solvent having a fluorine substituent in that a particularly high level of effect to improve safety is obtained. A mixed solvent containing DMC and an ether having a fluorine substituent such as pentafluoropropyl methyl ether or 2,2,3,3-tetrafluoropropyl difluoromethyl ether is more preferred because it is superior also in high current discharge properties. A solid electrolyte may be used instead of the above-mentioned electrolytic solution. As the solid electrolyte, for example, an organic polyelectrolyte such as polyethylene oxide-based polymers and polymers having at least one of a polyorganosiloxane chain and a polyoxyalkylene chain can be used. A so-called gel-type electrolyte prepared by causing a polymer to support an electrolytic solution may also be used. An inorganic solid electrolyte containing a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$ and $Li_2S$—$SiS_2$—$Li_2SO_4$ may also be used. The use of such a solid electrolyte can improve safety in some cases. In the event that a solid electrolyte is used in a nonaqueous electrolyte secondary battery, the solid electrolyte may serve as a separator and no separator may be needed in such a case.

EXAMPLES

The present invention is described in more detail below by examples. Evaluations of a lithium mixed metal oxide (positive electrode active material) and a charging/discharging test were carried out as follows.

(1) Preparation of Positive Electrode

A material prepared by mixing acetylene black and graphite in a weight ratio of 9:1 was used as a conductive material. PVdF was used as a binder, and a solution of PVdF in NMP was used as a binder solution. The PVdF was produced by KUREHA Corporation and the NMP was produced by Tokyo Chemical Industry Co., Ltd. A positive electrode active material and the conductive material were mixed and a binder was added thereto and kneaded therewith so as to provide a composition of positive electrode active material: conductive material:binder=86:10:4 (weight ratio), so that a positive electrode mixture paste was obtained. The paste was applied to a 40 μm thick Al foil, which was a current collector, and then vacuum dried at 150° C. for 8 hours, so that a positive electrode was obtained.

(2) Preparation of Nonaqueous Electrolyte Secondary Battery (Coin Cell)

A laminated film (thickness: 16 μm) produced by laminating a heat resistant porous layer onto a polyethylene porous film described later was used as a separator. A mixed solvent of EC:DMC:EMC=30:35:35 (volume ratio) was used as a solvent for an electrolytic solution. $LiPF_6$ was used as an electrolyte. An electrolytic solution was prepared by dissolving the electrolyte in the mixed solvent in a concentration of 1 mole/liter. Metal lithium was used as a negative electrode. The positive electrode was placed on the lower lid of a coin cell (manufactured by Hohsen Corporation) with its aluminum foil surface facing down, and the separator was placed thereon, and then the electrolytic solution (300 μl) was poured thereto. Next, the negative electrode was put on the upper side of the separator, and the upper lid of the coin cell was placed thereon with a gasket interpolated therebetween, and the lid was caulked using a caulking machine, so that a nonaqueous electrolyte secondary battery (coin-shaped battery R2032) was manufactured. The assembly of the battery was carried out in a glove box filled with an argon atmosphere.

(3) Charging/Discharging Test

By using the above-mentioned coin-shaped battery, a discharging rate test was carried out under the conditions provided below. A 0.2C discharge capacity and a 5C discharge capacity in the discharging rate test were determined, respectively, as follows.

<Discharging Rate Test>

Test temperature: 25° C.
Charging maximum voltage: 4.3 V
Charging time: 8 hours
Charging current: 0.2 mA/cm$^2$ The discharging minimum voltage was kept constant at 2.5 V during discharge, and discharge was performed while a discharging current was varied as follows. The higher the discharge capacity in 5C (higher current rate), the higher the power is meant to be.

Discharging of first cycle (0.2C): discharging current 0.2 mA/cm$^2$

Discharging of second cycle (5C): discharging current 5 mA/cm$^2$ (4) Evaluation of Transition Metal Mixed Hydroxide Composition Analysis of Transition Metal Mixed Hydroxide For an aqueous solution prepared by dissolving a powder of a transition metal mixed hydroxide in hydrochloric acid, composition analysis was carried out by using inductively coupled plasma spectroscopy (SPS3000 manufactured by SII).

Example 1

1. Production of Transition Metal Mixed Hydroxide and Lithium Mixed Metal Oxide

In a polypropylene beaker, 30.32 g of potassium hydroxide was added to 200 ml of distilled water and dissolved by stirring. The potassium hydroxide was dissolved completely, so that an aqueous potassium hydroxide solution (aqueous alkali solution) was prepared. In a glass beaker, 18.53 g of nickel (II) sulfate hexahydrate, 12.17 g of manganese (II) sulfate monohydrate, and 2.85 g of iron (II) sulfate heptahydrate (the molar ratio of Ni:Mn:Fe was 0.47:0.48:0.05) were added to 200 ml of distilled water and dissolved by stirring, so that a nickel-manganese-iron mixed aqueous solution was obtained. While the aqueous potassium hydroxide solution was stirred, the nickel-manganese-iron mixed aqueous solution was dropped thereto, so that a coprecipitate as a transition metal mixed hydroxide was generated and a coprecipitate slurry was obtained. The pH at the end of the reaction was 13.

Subsequently, the coprecipitate slurry was filtered, washed using 500 ml of distilled water, and then dried at 100° C., so that a coprecipitate $P_1$ as a transition metal mixed hydroxide was obtained. The coprecipitate $P_1$ (4.0 g) and 2.14 g of lithium carbonate as a lithium compound were dry mixed using an agate mortar to obtain a mixture. Subsequently, the mixture was put into a calcination container made of alumina, kept at 850° C. for 6 hours in the atmosphere using an electric furnace to calcine the mixture, and cooled to room temperature, so that a calcined product was obtained. The resultant was pulverized, washed with distilled water by decantation, filtered, and then dried at 300° C. for 6 hours, so that a powder $A_1$ as a lithium mixed metal oxide was obtained.

The composition analysis of the coprecipitate $P_1$ found the molar ratio of Li:Ni:Mn to be 0.47:0.48:0.05. The molar ratio of the molar content of K to the molar content of the transition metal mixed hydroxide was 0.000242. The molar ratio of the molar content of $SO_4$ to the molar content of the transition metal mixed hydroxide was 0.000189, and the molar ratio of the molar content of alkali metals other than Li to the molar content of $SO_4$ was 1.28.

2. Discharging Rate Test Of Nonaqueous Electrolyte Secondary Battery

A coin-shaped battery was produced using the powder $A_1$ and subjected to a discharging rate test. The discharge capacities (mAh/g) at 0.2C and 5C were as high as 140 and 114, respectively.

Comparative Example 1

1. Production of Transition Metal Mixed Hydroxide and Lithium Mixed Metal Oxide

The same operations as those in Example 1 were performed except that a coprecipitate slurry was filtered and washed with 5000 ml of distilled water, so that a coprecipitate $P_2$ as a transition metal mixed hydroxide and a powder $A_2$ as a lithium mixed metal oxide were obtained.

The composition analysis of the coprecipitate $P_2$ found the molar ratio of Ni:Mn:Fe to be 0.47:0.48:0.05. The molar ratio of the molar content of K to the molar content of the transition metal mixed hydroxide was 0.000002. The molar ratio of the molar content of $SO_4$ to the molar content of the transition metal mixed hydroxide was 0.000108, and the molar ratio of the molar content of alkali metals other than Li to the molar content of $SO_4$ was 0.02.

2. Discharging Rate Test of Nonaqueous Electrolyte Secondary Battery

A coin-shaped battery was produced using the powder $A_2$ and subjected to a discharging rate test. The discharge capacities (mAh/g) at 0.2C and 5C were as low as 103 and 29, respectively.

Comparative Example 2

1. Production of Transition Metal Mixed Hydroxide And Lithium Mixed Metal Oxide

The same operations as those in Example 1 were performed except that a coprecipitate slurry was filtered and washing was not performed, so that a coprecipitate $P_3$ as a transition metal mixed hydroxide and a powder $A_3$ as a lithium mixed metal oxide were obtained.

The composition analysis of the coprecipitate $P_3$ found the molar ratio of Ni:Mn:Fe to be 0.47:0.48:0.05. The molar ratio of the molar content of K to the molar content of the transition metal mixed hydroxide was 0.00316. The molar ratio of the molar content of $SO_4$ to the molar content of the transition metal mixed hydroxide was 0.000586, and the molar ratio of the molar content of alkali metals other than Li to the molar content of $SO_4$ was 5.39.

2. Discharging Rate Test of Nonaqueous Electrolyte Secondary Battery

A coin-shaped battery was produced using the powder $A_1$ and subjected to a discharging rate test. The discharge capacities (mAh/g) at 0.2C and 5C were as low as 130 and 113, respectively.

Production Example 1 (Production of Laminated Film)

(1) Production of Coating Slurry

After 272.7 g of calcium chloride had been dissolved in 4200 g of NMP, 132.9 g of paraphenylenediamine was added thereto and completely dissolved. To the resultant solution was gradually added 243.3 g of terephthaloyl dichloride to be polymerized, so that para-aramid was obtained, and this was further diluted with NMP, so that a para-aramid solution (A) having a concentration of 2.0% by weight was obtained. To the resultant para-aramid solution (100 g) were added 2 g of an alumina powder (a) (alumina C, produced by Nippon Aerosil Co., Ltd., average particle diameter: 0.02 µm) and 2 g of an alumina powder (b) (Sumicorundum AA03, produced by Sumitomo Chemical Co., Ltd., average particle diameter: 0.3 µm), 4 g in total, and mixed as fillers, and the resultant was processed with a NANOMIZER three times, and further filtered with a wire gauze with 1000 meshes, and then defoamed under reduced pressure, so that a coating slurry (B) was produced. The weight of the alumina powder (filler) relative to the total weight of the para-aramid and the alumina powder was 67% by weight.

(2) Production and Evaluation of Laminated Film

A polyethylene porous film (film thickness: 12 µm, air permeability: 140 seconds/100 cc, average pore diameter: 0.1 µm, porosity: 50%) was used as a porous film. The polyethylene porous film was secured onto a PET film having a thickness of 100 µm, and the coating slurry (B) was applied onto the porous film using a bar coater manufactured by Tester Sangyo Co., Ltd. The PET film and the coated porous film were immersed into water while being integrally kept, so that a para-aramid porous film (heat resistant layer) was deposited thereon, and the solvent was then dried and the PET film was peeled away, so that a laminated film 1 having the heat resistant porous layer and the porous film laminated to each other was obtained. The thickness of the laminated film 1 was 16 µm, and the thickness of the para-aramid porous film (heat resistant porous layer) was 4 µm. The air permeability of the laminated film 1 was 180 seconds/100 cc, and the porosity thereof was 50%. The observation of the cross section of the heat resistant porous layer in the laminated film 1 by a scanning electron microscope (SEM) found that comparatively small fine pores as small as about 0.03 µm to 0.06 µm and comparatively large fine pores as large as about 0.1 µm to 1 µm were present. Laminated films were evaluated by the following methods.
<Evaluation of a Laminated Film>

(A) Measurement of Thickness The thickness of a laminated film and the thickness of a porous film were measured in accordance with JIS (K7130-1992). A value obtained by subtracting the thickness of the porous film from the thickness of the laminated film was used as the thickness of a heat resistant porous layer.

(B) Measurement of Air Permeability by Gurley Method

The air permeability of a laminated film was measured using a Gurley densometer with a digital timer manufactured by Yasuda Seiki Seisakusho Ltd. on the basis of JIS P 8117.
(C) Porosity A sample of a laminated film obtained was cut into a square 10 cm on each side, and the weight W (g) and the thickness D (cm) thereof were measured. The weight of each layer in the sample (Wi (g); i is an integer of 1 to n) was measured and the volume of each layer was calculated from Wi and the true specific gravity (true specific gravity i (g/cm$^3$)) of the material of each layer. Then, the porosity (volume %) was calculated from the following formula:

Porosity (% by volume)=100×{1−(W1/(true specific gravity 1)+W2/ (true specific gravity 2)+ . . . +Wn/(true specific gravity n))/(10×10× D)}

INDUSTRIAL APPLICABILITY

According to the present invention, it is possible to provide a nonaqueous electrolyte secondary battery being superior in capacity and output characteristics to the conventional lithium secondary batteries, and especially, being very useful for a nonaqueous electrolyte secondary battery for applications in which a high capacity and a high output at a high electric current rate are required, that is, for applications in automobiles and in power tools such as electric tools.

The invention claimed is:

1. A method for producing a lithium mixed metal oxide, the method comprising the following steps (1)-(3):
   (1) a step of bringing an aqueous solution containing a transition metal element and SO$_4$ into contact with an alkali comprising an alkali metal other than Li to obtain a coprecipitate slurry,
   (2) a step of obtaining a transition metal mixed hydroxide containing the alkali metal other than Li, SO$_4$ and the transition metal element from the coprecipitate slurry, and
   (3) a step of calcining a mixture of the transition metal mixed hydroxide and a lithium compound by maintaining the mixture at a temperature of 650 to 1000° C. to obtain the lithium mixed metal oxide,
   wherein within the transition metal mixed hydroxide the molar ratio of the molar content of the alkali metal other than Li to the molar content of the SO$_4$ is not less than 1 and is less than 2 and the molar ratio of the molar content of the alkali metal other than Li to the molar content of the transition metal mixed hydroxide is 0.00001 to 0.003.

2. The method according to claim 1, wherein the transition metal elements composing the transition metal mixed hydroxide are Ni, Mn and Fe.

3. The method according to claim 2, wherein the aqueous solution is an aqueous solution obtained by dissolving a sulfate of Ni, sulfate of Mn and a sulfate of Fe in water.

4. The method according to claim 3, wherein the sulfate of Fe is a sulfate of divalent Fe.

5. The method according to claim 3, wherein the molar ratio of Ni, Mn and Fe is 1−x−y:x:y (wherein, x is not less than 0.3 and not more than 0.7, y is more than 0 and less than 0.2).

6. The method according to claim 2, wherein the molar ratio of Ni, Mn and Fe is 1−x−y:x:y (wherein, x is not less than 0.3 and not more than 0.7, y is more than 0 and less than 0.2).

7. The method according to claim 1, wherein the aqueous solution is an aqueous solution obtained by dissolving a sulfate of Ni, sulfate of Mn and a sulfate of Fe in water.

8. The method according to claim 7, wherein the sulfate of Fe is a sulfate of divalent Fe.

9. The method according to claim 8, wherein the molar ratio of Ni, Mn and Fe is 1−x−y:x:y (wherein, x is not less than 0.3 and not more than 0.7, y is more than 0 and less than 0.2).

10. The method according to claim 7, wherein the molar ratio of Ni, Mn and Fe is 1−x−y:x:y (wherein, x is not less than 0.3 and not more than 0.7, y is more than 0 and less than 0.2).

11. The method according to claim 1, wherein the molar ratio of the molar content of the alkali metal other than Li to the molar content of the transition metal mixed hydroxide is 0.00001 to 0.002.

12. The method according to claim 1, wherein the molar ratio of the molar content of the alkali metal other than Li to the molar content of the transition metal mixed hydroxide is 0.00001 to 0.001.

\* \* \* \* \*